(12) United States Patent
Kim

(10) Patent No.: US 9,701,870 B2
(45) Date of Patent: Jul. 11, 2017

(54) WATERPROOFING AGENT COMPOSITION AND METHOD OF PREPARING THE SAME

(71) Applicant: Hyun Yong Kim, Siheung-si (KR)

(72) Inventor: Hyun Yong Kim, Siheung-si (KR)

(73) Assignee: CREAT & REUSE CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 14/894,110

(22) PCT Filed: Sep. 12, 2014

(86) PCT No.: PCT/KR2014/008522
§ 371 (c)(1),
(2) Date: Nov. 25, 2015

(87) PCT Pub. No.: WO2015/037938
PCT Pub. Date: Mar. 19, 2015

(65) Prior Publication Data
US 2016/0186010 A1 Jun. 30, 2016

(51) Int. Cl.
*C09D 193/00* (2006.01)
*C09D 193/04* (2006.01)
(Continued)

(52) U.S. Cl.
CPC ......... *C09D 193/04* (2013.01); *C09D 7/1216* (2013.01); *C09D 109/06* (2013.01);
(Continued)

(58) Field of Classification Search
CPC .. C09D 125/04; C09D 125/06; C09D 125/08; C09D 193/04; C09D 193/00; C09D 7/001; C09D 109/06; C09D 123/00; C09D 123/06; C09D 127/04; C09D 127/12; C08L 2555/80; C08L 2555/82; C08L 2666/00; C08L 2666/02; C08L 2666/68; C08L 2207/20; C08L 2201/56; C08L 2205/18;
(Continued)

(56) References Cited

FOREIGN PATENT DOCUMENTS

FR 2649353 A1 * 1/1991 ............ B29B 13/022
KR 20000047781 7/2000
(Continued)

OTHER PUBLICATIONS

KR 101218944 B1, Jan. 2013, English Ab.*
FR 2649353 A1, Jan. 1991, English Ab.*
KR 20030077916 A, Oct. 2003, Machine translation.*

*Primary Examiner* — Satya Sastri
(74) *Attorney, Agent, or Firm* — IPLA P.A.; James E. Bame

(57) ABSTRACT

A waterproofing agent composition comprises 100 parts by weight of the pine resin, 20 to 70 parts by weight of an expanded styrene resin, 1 to 10 parts by weight of a vinyl-based resin and 100 to 750 parts by weight of an organic solvent. The waterproofing agent composition is a liquid and exhibits superior adhesion to various materials, thus providing proofing characteristics, humidity resistance and permeability resistance to surfaces of various materials water. In addition, the waterproofing agent composition may provide heat insulation characteristics along with waterproofing characteristics, humidity resistance and permeability resistance to subjects or bases, thus being used for various purposes.

6 Claims, 1 Drawing Sheet

(51) Int. Cl.
    *C09K 3/18*     (2006.01)
    *C09D 109/06*     (2006.01)
    *C09D 7/12*     (2006.01)
    *C08K 3/34*     (2006.01)
    *C08K 3/22*     (2006.01)

(52) U.S. Cl.
    CPC .............. *C09D 193/00* (2013.01); *C09K 3/18* (2013.01); *C08K 3/34* (2013.01); *C08K 2003/2206* (2013.01); *C08K 2003/2241* (2013.01)

(58) Field of Classification Search
    CPC .......... C08D 109/06; C08K 2003/2206; C08K 2003/2241; C08K 3/34
    See application file for complete search history.

(56) References Cited

FOREIGN PATENT DOCUMENTS

| | | | |
|---|---|---|---|
| KR | 1020010101592 | | 11/2001 |
| KR | 20030077916 | | 10/2003 |
| KR | 20030077916 | A * | 10/2003 |
| KR | 20060073390 | | 6/2006 |
| KR | 20110074860 | | 7/2011 |
| KR | 101218944 | B1 * | 1/2013 |

* cited by examiner

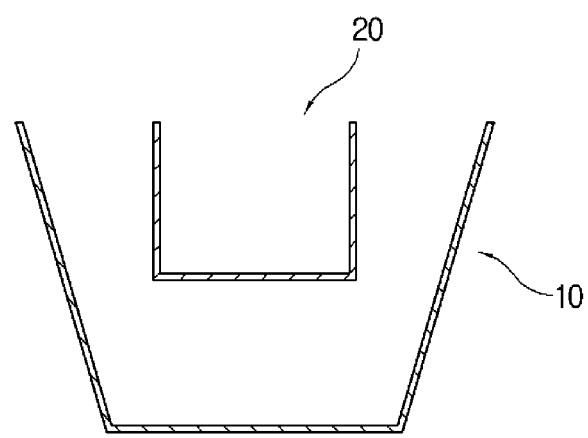

WATERPROOFING AGENT COMPOSITION AND METHOD OF PREPARING THE SAME

BACKGROUND

The present invention relates to a waterproofing agent composition and a method of preparing the same, and more particularly to a waterproofing agent composition that may provide waterproofing characteristics, humidity resistance and permeability resistance to surfaces of various materials, and a method of preparing the same.

Waterproofing agents are used to protect materials against water or humidity in a variety of fields. For example, waterproofing agents may be used to protect various materials such as furniture manufactured from wood, etc., ships manufactured from metal, etc., materials for construction, and outer walls and floors of buildings.

As such waterproofing agents, waterproof paints including epoxy and urethane as main raw materials are used. In addition, waterproof asphalt, waterproof urethane paint, and the like are used in waterproof construction requiring special work.

Conventional waterproof urethane paint or waterproof epoxy paint forms waterproofing layers on subjects or bases by means of a primer. While work using such a manner may be easily performed, bonding strength is unstable during working and thus a waterproofing layer should be thickly formed.

In addition, since a heat insulation layer, other than a waterproofing layer, should be additionally formed on subjects or bases requiring heat insulation, the thicknesses of protective layers of subjects or bases become excessively thick. Lifespan of such thick protective layers due to poor weather resistance is shorter than that of subjects or bases of buildings, facilities, or the like. As a result, protective layers should be maintained and repaired.

SUMMARY OF THE INVENTION

Therefore, the present invention has been made in view of the above problems, and it is an object of the present invention to provide a waterproofing agent composition that may provide waterproofing characteristics, humidity resistance and permeability resistance to surfaces of various materials.

It is another object of the present invention to provide a method of preparing the waterproofing agent composition.

In accordance with the present invention, the above and other objects can be accomplished by the provision of a waterproofing agent composition comprising 100 parts by weight of a pine resin, 20 to 70 parts by weight of an expanded styrene resin, 1 to 10 parts by weight of a vinyl-based resin and 100 to 750 parts by weight of an organic solvent.

The vinyl-based resin may be, for example, a polyvinyl chloride resin, a polyethylene resin, a vinyl acetate resin, a polyvinyl alcohol resin, a polyacrylonitrile resin, a polystyrene resin, a polyvinyl acetal resin, a polyvinyl formal resin, a polyvinyl butyral resin, a polyvinylidene fluoride resin, a polyvinylidene chloride resin, a mixture thereof or a copolymer thereof.

The organic solvent may include alcohol, an ether-based solvent, an ester-based solvent, an aromatic solvent or a ketone-based solvent.

The waterproofing agent composition may further comprise silicate, lime or titanium dioxide.

The waterproofing agent composition may be used in an airless spray form.

In accordance with an aspect of the present invention, the above and other objects can be accomplished by the provision of a method of preparing a waterproofing agent composition, the method comprising: preparing a solution by dissolving 100 parts by weight of a pine resin in 100 to 750 parts by weight of an organic solvent; and dissolving 1 to 10 parts by weight of a vinyl-based resin and 20 to 70 parts by weight of an expanded styrene resin in the solution of the preparing.

In the dissolving, silicate, lime or titanium dioxide may be additionally added.

Advantageous Effects

A waterproofing agent composition according to the present invention is a liquid-type and exhibits superior adhesion to various materials, thus providing proofing characteristics, humidity resistance and permeability resistance to surfaces of various materials. In addition, the waterproofing agent composition may simultaneously provide heat insulation characteristics along with waterproofing characteristics, humidity resistance and permeability resistance, thereby being utilized in various applications.

BRIEF DESCRIPTION OF DRAWINGS

FIG. 1 schematically illustrates a cross-sectional view of an embodiment of a double reaction container.

DETAILED DESCRIPTION OF THE INVENTION

Hereinafter, the present invention is described in more detail.

A waterproofing agent composition according to an embodiment of the present invention includes a pine resin, an expanded styrene resin, a vinyl-based resin and an organic solvent.

Pine resin indicates balsam secreted when pinaceae trees are damaged and is also called rosin. Such pine resin may be obtained by nicking, for example, pinaceae trees.

Pine resin is a colorless and transparent liquid when secreted from trees, but become milky and sticky over time. It was known that such pine resin included 70 to 75% by weight of rosin, 18 to 22% by weight of turpentine, and 5 to 7% by weight of water or other impurities. Since pine resin is composed of the ingredients, a waterproofing agent composition having superior waterproofing characteristics and humidity resistance may be provided therefrom.

For example, commercially available pine resin used in the art or products, which are obtained by scratching pinaceae trees, filtered in order to remove floating substances therefrom, etc. may be used.

The expanded styrene resin is well known as Styrofoam, a product name of plastic. As the expanded styrene resin included in the waterproofing agent composition, commercially available resins, resins prepared according to methods known in the art, or waste Styrofoam may be used.

The expanded styrene resin may be used in an amount of 20 to 70 parts by weight, 20 to 60 parts by weight, 20 to 50 parts by weight, 30 to 70 parts by weight, 40 to 70 parts by weight, 30 to 60 parts by weight, or 40 to 50 parts by weight based on 100 parts by weight of the pine resin. When the expanded styrene resin is used within this range, a waterproofing agent composition having heat insulation characteristics as well as proper waterproofing characteristics and humidity resistance may be provided.

As the vinyl-based resin, various vinyl-based resins, other than a polyvinyl chloride resin known generally as a vinyl resin, may be used. That is, the vinyl-based resin of the present specification includes a polymer obtained through polymerization of a monomer including a carbon-carbon double bond and a polymer obtained by reacting the polymer with a compound such as aldehyde, etc. The monomer including a carbon-carbon double bond includes monomers including a vinyl group ($CH_2=CH-$) and monomers having a vinyl group with a substituent except for hydrogen, for example, a halogen atom, an aromatic group, an alkyl group, an ester group, a hydroxy group, a nitrile group, etc. Accordingly, as the vinyl-based resin, for example, polyvinyl chloride (PVC) resin, polyethylene (PE) resin, a vinyl acetate resin, polyvinyl alcohol (PVA) resin, a polyacrylonitrile (PAN) resin, a polystyrene (PS) resin, a polyvinyl acetal resin, a polyvinyl formal resin, a polyvinyl butyral resin, a polyvinylidene fluoride resin, a polyvinylidene chloride resin, a mixture thereof or a copolymer thereof may be used. The resin copolymer indicates a copolymer obtained by polymerizing two or more monomers among monomers for preparing the resin.

The vinyl-based resin may be used in an amount of 1 to 10 parts by weight, 1 to 8 parts by weight, 1 to 6 parts by weight, 2 to 10 parts by weight, 3 to 10 parts by weight, 2 to 8 parts by weight or 3 to 6 parts by weight based on 100 parts by weight of the pine resin. When the vinyl-based resin is used within these ranges, a waterproofing agent composition having proper adhesion to various materials, waterproofing characteristics and humidity resistance may be provided.

As the organic solvent, a solvent that may dissolve the ingredients described above may be used. As the organic solvent, for example, alcohol such as methanol, ethanol, propanol, butanol, pentanol or hexanol; an ether-based solvent such as dimethylether, diethylether, methylethylether, dipropylether, methylpropylether, ethylpropylether, dibutylether, methylbutylether, ethylbutylether or propylbutylether; an ester-based solvent such as ethyl acetate; an aromatic solvent such as benzene, toluene, xylene or naphtha; a ketone-based solvent such as acetone, methylethylketone or methylisobutylketone; or the like may be used.

In an embodiment, as the organic solvent, a solvent including only acetone or a mixed solvent including acetone and other solvents, which may satisfactorily dissolve a pine resin, an expanded styrene resin and a vinyl-based resin, may be used.

In addition, when the organic solvent includes an aromatic solvent, bubble generation during coating with the waterproofing agent composition may be prevented while providing a liquid-type waterproofing agent composition. As a result, a waterproofing layer having a uniform surface may be provided.

Such an organic solvent is used in an amount of 100 to 750 parts by weight, 300 to 750 parts by weight or 500 to 750 parts by weight based on 100 parts by weight of the pine resin, thus providing a waterproofing agent composition including the ingredients dissolved in the organic solvent. In addition, a waterproofing agent composition having proper viscosity may be provided. A liquid-type waterproofing agent composition having such viscosity may be applied regardless of materials and surface shapes of subjects to be adhered, thus providing a surface with proper waterproofing characteristics and humidity resistance to various subjects to be adhered.

In addition, when the organic solvent includes an aromatic solvent, the aromatic solvent is used in an amount of 1 to 10 parts by weight based on 100 parts by weight of the organic solvent, thus providing a waterproofing agent composition that may properly suppress bubble generation during coating. Accordingly, such a composition may minimize bubble generation during coating, thus providing a superior waterproofing layer.

The waterproofing agent composition may additionally include, other than the ingredients described above, additives for controlling the strength, viscosity and/or color of the waterproofing agent composition. As the additives, for example, silicate, lime, titanium dioxide, pigments, etc. may be used.

As the silicate, for example, talc, mica, wollastonite, vermiculite, calcium silicate, feldspar, acid clay, sericite, bentonite, glass flakes, chlorite, serpentine and a mixture thereof may be used. In an embodiment, when talc is used as silicate, a waterproofing agent composition that may form a glossy white coating layer may be provided due to peculiar gloss of talc, and high strength may be provided to the waterproofing layer. In addition, talc may be usefully used because it may control the viscosity of a waterproofing agent composition.

The content of the silicate may be controlled considering the strength, color or viscosity of a coating layer from the waterproofing agent composition. In an embodiment, the silicate is included in the waterproofing agent composition in an amount of 1 to 100 parts by weight based on 100 parts by weight of the pine resin, thus controlling the viscosity and providing a glossy white coating layer with superior durability.

As the lime, calcium oxide, calcium hydroxide or a mixture thereof may be used. The content of the lime may be controlled considering the color of a coating layer provided from the waterproofing agent composition or coating characteristics of the waterproofing agent composition. In an embodiment, the lime may be included in the a waterproofing agent composition in an amount of 1 to 100 parts by weight based on 100 parts by weight of the pine resin, thus providing a waterproofing agent composition having proper viscosity.

As the titanium dioxide, for example, anatase-type titanium dioxide, rutile-type titanium dioxide and a mixture thereof may be used. The content of the titanium dioxide may be properly controlled to secure proper viscosity of the waterproofing agent composition and to control the gloss of a coating layer obtained from the composition. In an embodiment, the lime is included in the waterproofing agent composition in an amount of 1 to 50 parts by weight based on 100 parts by weight of the pine resin, thus providing a waterproofing agent composition having proper viscosity and a coating layer having polished gloss.

The waterproofing agent composition may additionally include, other than ingredients described above, general additives that may be used in the art of the present invention.

A method of preparing the waterproofing agent composition according to an embodiment of the present invention includes a first step of preparing a solution by dissolving a pine resin in an organic solvent; and a second step of dissolving a vinyl-based resin and an expanded styrene resin in a solution prepared according to the first step. By dissolving a predetermined content of the pine resin in the organic solvent and then mixing the vinyl-based resin and the expanded styrene resin with the solution in which the pine resin is dissolved as in the method of preparing the waterproofing agent composition, a waterproofing agent composition including a uniformly dissolved pine resin, vinyl-based resin and expanded styrene resin may be provided. Such a liquid-type waterproofing agent composition may infiltrate into subjects or bases including pores, thus providing a surface having proper waterproofing characteristics and humidity resistance to various materials, regardless of material types and surface shapes of the materials. In addition, the liquid-type waterproofing agent composition may be sprayed in a mist form, dust does not occur, and a waterproofing layer may be formed through application of an airless spray manner in order to simply form a thin and uniform coating layer.

The pine resin used in the first step may be one of the pine resins described above. In addition, a mix ratio of the pine resin and the organic solvent may be controlled as described above, thus providing an airless spray-type waterproofing agent composition.

The first step may include adding the pine resin to the organic solvent and stirring a solution including the pine resin. The temperature, the time, etc. of this process may be controlled considering the boiling point of the organic solvent. Hereinafter, the temperature and time in acetone having 50% by weight or more, as an example, among organic solvents are described, but the temperature and time may be controlled depending upon the boiling point of a solvent used.

The step of adding the pine resin to the organic solvent may be carried out, for example, at 25° C. to 50° C. In addition, the time taken to add the pine resin to organic solvent may be, for example, 10 to 60 min. The organic solvent may be stirred even during addition of the pine resin. In addition, the stirring process of the solution including the pine resin may be, for example, carried out while elevating temperature to 50° C. to 60° C. In addition, the step of stirring the solution including the pine resin may be carried out, for example, for 10 to 60 min. When temperature and/or time is controlled as described above during addition of the pine resin to the organic solvent and stirring the solution including the pine resin, a solution in which the pine resin is uniformly dissolved may be prepared while maintaining properties of the pine resin.

The second step includes dissolving the vinyl-based resin and the expanded styrene resin in a solution prepared according to the first step. Also in this process, temperature, time, etc. may be controlled considering the boiling point of a used organic solvent. Hereinafter, although temperature and time are described using 50% by weight of acetone, as an example, among the organic solvents, the temperature and time may be adjusted depending upon the boiling point of solvent used. In addition, addition sequences of the vinyl-based resin and the expanded styrene resin may be properly controlled considering preparation devices, etc.

In an embodiment, the vinyl-based resin and the expanded styrene resin may be simultaneously added to a solution prepared according to the first step. Adding the vinyl-based resin and the expanded styrene resin to a solution prepared according to the first step may be carried out, for example, at 50° C. to 60° C. In addition, time taken to add the vinyl-based resin to the solution may be, for example, 10 to 60 min. Temperature and/or time during addition of the vinyl-based resin and the expanded styrene resin to the solution may be adjusted as described above, thus providing a waterproofing agent composition in which the vinyl-based resin and the expanded styrene resin are uniformly dissolved and preventing evaporation of the solution.

During addition of the vinyl-based resin and the expanded styrene resin, the solution prepared according to the first step may be stirred or not. In addition, after adding the vinyl-based resin and the expanded styrene resin, regardless of stirring, to the solution, the solution including the same may be stirred. When the solution including the vinyl-based resin and the expanded styrene resin is stirred, temperature during the stirring may be controlled to the temperature during the addition. In addition, stirring of the solution including the vinyl-based resin and the expanded styrene resin may be carried out for about 1 to 60 min. Temperature and/or time during stirring of the solution including the vinyl-based resin and the expanded styrene resin is controlled as described above, thus providing a waterproofing agent composition in which each ingredient is uniformly dissolved.

The waterproofing agent composition may be prepared using one reaction container or a double reaction container. The double reaction container is composed of two reaction containers 10 and 20, the sizes of which are different. Here, the small reaction container 20 of the two reaction containers 10 and 20 may be fixed to the interior of the large reaction container 10. When such a double reaction container is used, a surface of the small reaction container is enveloped by a medium contained in the large reaction container, whereby the small reaction container in which real reaction is performed may be less affected by environmental factors. In addition, heat may be uniformly transferred to a wide area of the small reaction container by controlling the temperature of the medium contained in the large reaction container.

In an embodiment, when, in the method of preparing the waterproofing agent composition, the temperature of the solution is controlled as described above, the large reaction container is filled with water and the temperature of the water may be controlled to 30° C. to 100° C., 40° C. to 90° C. or 40° C. to 80° C.

The method of preparing the waterproofing agent composition may include additionally adding an additive in the second step. As the additive, the silicate, the lime, titanium dioxide and the pigments described above, which may control the strength, viscosity and/or color of the waterproofing agent composition, may be used. In addition, the content of the additive may be controlled within the range described above.

In addition, the method of preparing the waterproofing agent composition may further include a step of additionally adding general additives used in the art of the present invention and/or steps generally performed in the art of the present invention.

Now, the present invention will be described in more detail with reference to the following examples. These examples are provided only for illustration of the present invention and should not be construed as limiting the scope and spirit of the present invention.

Preparation Example: Preparation of Waterproofing Agent Composition

Example

Two reaction containers with different sizes were prepared as illustrated in FIG. 1, and a small reaction container was fixed to the interior of a large reaction container. The large reaction container was filled with water and 17 L (13.4 kg) of acetone and 300 g of xylene were added to the small reaction container. The temperature of the water contained in the large reaction container was maintained at about 46° C. such that the temperature of the organic solvent contained in the small container was about 38° C.

Subsequently, 2300 g of a pine resin was added to the small reaction container for about 30 minutes. Subsequently, stirring was performed for about 30 minutes while maintaining the temperature of water contained in the large reaction container at about 65° C., such that the temperature of the solution including the pine resin became about 57° C.

While stirring the solution, 100 g of a polystyrene resin, 1000 g of an expanded styrene resin (Manufacturer: Bucheon Resin Co., LTD.), 2000 g of talc (Manufacturer: KOCH) and 100 g of titanium dioxide were added thereto at about 57° C. for about 30 minutes, followed by stirring. As a result, a waterproofing agent composition was prepared.

Comparative Example

A waterproofing agent composition was prepared in the same manner as in Example, except that the pine resin was used in an amount of 1800 g.

Experimental Example: Property Measurement of Waterproofing Agent Composition

Properties of the waterproofing agent composition prepared according to Example and Comparative Example were measured. Results are summarized in Table 1 below.

TABLE 1

|  |  | Comparative Example | Example |
|---|---|---|---|
| Form [1] |  | X | ○ |
| Adhesion (N/mm$^2$) [2] | Steel material | Measurement impossible | 4.0 |
|  | Mortar | Measurement impossible | 2.4 |
| Absorption amount [3] |  | Measurement impossible | 0 |
| Permeability resistance [4] |  | Measurement impossible | Normal |

[1] Form: The case that non-dissolved floating substances were not observed with the naked eye and a liquid was obtained was marked as ⌈○⌋, and the case that floating substances were observed was marked as ⌈X⌋.
[2] Adhesion: The adhesions of the waterproofing agent compositions according to Example and Comparative Example were measured using a steel material and mortar as subjects to be adhered, according to KS F 4636: 2008.
[3] Absorption amount: Measured according to KS F 4919: 2008.
[4] Permeability resistance: Measured according to KS F 4919: 2008. The case that percolation did not occur under a hydraulic pressure of 0.3 N/mm$^2$ for three hours was marked as ⌈Normal⌋, and the case that percolation was observed under the same condition was marked as ⌈Problem⌋.

Referring to Table 1, it can be confirmed that, in the case of Example, superior adhesion to a variety of bases is exhibited, and all of waterproofing characteristics, humidity resistance and permeability resistance are superior. Accordingly, it can be confirmed that waterproofing agent composition according to Example may be applied to various materials and a waterproofing layer having superior performances is formed.

However, when the organic solvent was used in an amount of greater than 750 parts by weight based on 100 parts by weight of the pine resin as in Comparative Example, a waterproofing agent composition in which a large amount of aggregates was generated is obtained. It was impossible to form a coating layer, which may be subject to experiments, due to the large amount of the aggregates of the waterproofing agent composition according to Comparative Example.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention exhibits superior adhesion to various materials, thus providing waterproofing characteristics, humidity resistance and permeability resistance to surfaces of various materials. In addition, heat insulation characteristics may be simultaneously provided along with waterproofing characteristics, humidity resistance and permeability resistance, whereby the present invention may be utilized in various applications.

The invention claimed is:

1. A waterproofing agent composition comprising 100 parts by weight of a pine resin, 20 to 70 parts by weight of a styrene resin, 1 to 10 parts by weight of a vinyl-based resin and 100 to 750 parts by weight of an organic solvent, wherein the composition is used in an airless spray form.

2. The waterproofing agent composition according to claim 1, wherein the vinyl-based resin is a polyvinyl chloride resin, a polyethylene resin, a polyvinyl alcohol resin, a polyacrylonitrile resin, a polystyrene resin, a polyvinyl acetal resin, a polyvinyl formal resin, a polyvinyl butyral resin, a polyvinylidene fluoride resin, a polyvinylidene chloride resin, or a mixture thereof.

3. The waterproofing agent composition according to claim 1, wherein the organic solvent comprises an alcohol, an ether-based solvent, an ester-based solvent, an aromatic solvent or a ketone-based solvent.

4. The waterproofing agent composition according to claim 1, further comprising silicate, lime or titanium dioxide.

5. A method of preparing a waterproofing agent composition, comprising the steps of:
(a) preparing a solution by dissolving 100 parts by weight of a pine resin in 100 to 750 parts by weight of an organic solvent; and
(b) dissolving 1 to 10 parts by weight of a vinyl-based resin and 20 to 70 parts by weight of an expanded styrene resin in said solution.

6. The method according to claim 5 further comprising: adding silicate, lime or titanium dioxide in said solution in step (b).

* * * * *